US 9,900,854 B2

(12) United States Patent
Hirayama et al.

(10) Patent No.: US 9,900,854 B2
(45) Date of Patent: Feb. 20, 2018

(54) SIGNAL PROCESSING DEVICE AND SIGNAL PROCESSING METHOD (71) Applicant: Sony Corporation, Tokyo (JP)

(72) Inventors: Yuichi Hirayama, Chiba (JP); Satoshi Okada, Tokyo (JP); Yuichi Mizutani, Tokyo (JP); Sotaro Ohara, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/402,252

(22) PCT Filed: May 23, 2013

(86) PCT No.: PCT/JP2013/064329
§ 371 (c)(1),
(2) Date: Nov. 19, 2014

(87) PCT Pub. No.: WO2013/179999
PCT Pub. Date: Dec. 5, 2013

(65) Prior Publication Data
US 2015/0139220 A1    May 21, 2015

(30) Foreign Application Priority Data

May 31, 2012  (JP) .................... 2012-125261

(51) Int. Cl.
H04W 56/00    (2009.01)
H04L 1/00    (2006.01)
(Continued)

(52) U.S. Cl.
CPC ............ *H04W 56/001* (2013.01); *H04B 1/28* (2013.01); *H04L 1/0001* (2013.01);
(Continued)

(58) Field of Classification Search
CPC ..... H04L 1/0001; H04L 27/22; H04L 7/0334; H04B 1/28; H04B 1/00
(Continued)

(56) References Cited

U.S. PATENT DOCUMENTS 4,972,408 A  * 11/1990 Le Bihan Herve ....... H04J 7/00
                                                        370/211
5,956,376 A  *  9/1999 Nakaya .................... H04B 1/28
                                                        375/340
(Continued)

FOREIGN PATENT DOCUMENTS

JP    07-154441    6/1995
JP    2008-167115    7/2008
(Continued)

OTHER PUBLICATIONS

Notification of Reason(s) for Refusal issued in connection with Japanese Patent Application No. 2012-125261, dated Jun. 11, 2015. (8 pages).

(Continued)

Primary Examiner — Jae Y Lee
Assistant Examiner — Jean F Voltaire
(74) Attorney, Agent, or Firm — K&L Gates LLP (57) ABSTRACT There is provided a signal processing device including a selection unit that selects and outputs one clock serving as a transport stream (TS) clock, which represents timing of data of a TS, among a plurality of clocks with frequencies not less than a serial rate which is a data rate at which the TS included in a radio frequency (RF) signal is output in a serial manner.

13 Claims, 10 Drawing Sheets (51) Int. Cl.
- *H04L 12/701* (2013.01)
- *H04L 7/033* (2006.01)
- *H04L 12/46* (2006.01)
- *H04B 1/28* (2006.01)
- *H04N 5/21* (2006.01)
- *H04N 5/455* (2006.01)
- *H04N 21/43* (2011.01)
- *H04N 21/438* (2011.01)
- *H04L 27/36* (2006.01)
- *H04L 12/64* (2006.01)
- *H04B 1/707* (2011.01)
- *H04L 27/22* (2006.01)
- *H04L 12/853* (2013.01)
- *H04B 1/00* (2006.01)
- *H04L 27/38* (2006.01)

(52) U.S. Cl.
CPC ........ *H04L 7/0334* (2013.01); *H04L 12/4633* (2013.01); *H04L 45/00* (2013.01); *H04N 5/21* (2013.01); *H04N 5/455* (2013.01); *H04N 21/4305* (2013.01); *H04N 21/4382* (2013.01); *H04B 1/00* (2013.01); *H04B 1/707* (2013.01); *H04B 2201/70703* (2013.01); *H04L 12/6418* (2013.01); *H04L 27/22* (2013.01); *H04L 27/36* (2013.01); *H04L 27/38* (2013.01); *H04L 47/2416* (2013.01)

(58) Field of Classification Search
USPC .......................................... 370/350
See application file for complete search history.

(56) References Cited

U.S. PATENT DOCUMENTS

| | | | | |
|---|---|---|---|---|
| 6,088,347 | A * | 7/2000 | Minn | H04B 7/264 370/342 |
| 6,359,878 | B1 * | 3/2002 | Lakkis | H04W 84/14 370/342 |
| 8,102,897 | B1 * | 1/2012 | Mower | H04B 1/707 370/335 |
| 2002/0141347 | A1 * | 10/2002 | Harp | H04L 25/03343 370/248 |
| 2006/0174032 | A1 * | 8/2006 | Winchester | H04L 12/4633 709/238 |
| 2008/0298519 | A1 | 12/2008 | Tsutsui et al. | |
| 2009/0304361 | A1 * | 12/2009 | Chan | H04L 27/36 386/357 |

FOREIGN PATENT DOCUMENTS

| | | |
|---|---|---|
| JP | 2010-183300 | 8/2010 |
| WO | 2007/058341 | 5/2007 |

OTHER PUBLICATIONS

International Search Report issued in connection with International Patent Application No. PCT/JP2013/064329, dated Aug. 13, 2013. (1 page).

Notification of Grant issued in connection with Japanese Patent Application No. 2012-125261, dated Aug. 20, 2015. (2 pages).

* cited by examiner

SIGNAL PROCESSING DEVICE AND SIGNAL PROCESSING METHOD

CROSS REFERENCES TO RELATED APPLICATIONS

The present application is a national stage of International Application No. PCT/JP2013/064329 filed on May 23, 2013 and claims priority to Japanese Patent Application No. 2012-125261 filed on May 31, 2012, the disclosure of which is incorporated herein by reference.

BACKGROUND

The present technology relates to a signal processing device and a signal processing method and specifically relates to a signal processing device and a signal processing method in which receiving capability of a receiving system which receives a radio frequency (RF) signal is prevented from deteriorating, for example, due to a transport stream (TS) clock and its higher harmonics acting as noise against the RF signal, which clock represents timing of data of a TS in the occasion when the TS included in the RF signal is output in a serial manner.

For example, in digital broadcasting, an image (moving image) and the like is encoded in a predetermined encoding scheme such as the moving picture experts group (MPEG) and an RF signal including a TS constituted of a TS packet in which the resulting encoded data is arranged in a payload is transmitted.

In a receiving system which receives the digital broadcasting, demodulation and error correction of the RF signal are performed, and thereby, the TS is restored and output.

In the receiving system, signals output from a forward error correction (FEC) module which performs the error correction include the TS, a TS clock signal representing timing of data of the TS, and the like (for example, Patent Literature 1).

CITATION LIST

Patent Literature

Patent Literature 1: JP 2008-167115A

SUMMARY

Technical Problem

When the FEC module outputs the TS in a serial manner, the TS clock appears as a signal with high frequency not less than the data rate of the TS (in a serial manner).

In a conventional receiving system, a clock with fixed frequency is output as the TS clock. Hence, depending on the frequency thereof, there is a case where the TS clock and its higher harmonics largely affect the RF signal as noise against the RF signal, causing receiving capability of the receiving system to deteriorate.

The present technology is devised in view of such circumstances for making it possible to prevent deterioration of receiving capability of a receiving system which receives an RF signal due to a TS clock and its higher harmonics acting as noise against the RF signal including a TS.

Solution to Problem

According to an aspect of the present technology, a signal processing device includes a selection unit that selects and outputs one clock serving as a transport stream (TS) clock, which represents timing of data of a TS, among a plurality of clocks with frequencies not less than a serial rate which is a data rate at which the TS included in a radio frequency (RF) signal is output in a serial manner.

According to an aspect of the present technology, a signal processing method includes a selection step of selecting and outputting one clock serving as a transport stream (TS) clock, which represents timing of data of a TS, among a plurality of clocks with frequencies not less than a serial rate which is a data rate at which the TS included in a radio frequency (RF) signal is output in a serial manner.

According to an aspect of the present technology, one clock serving as a transport stream (TS) clock, which represents timing of data of a TS, among a plurality of clocks with frequencies not less than a serial rate which is a data rate at which the TS included in a radio frequency (RF) signal is output in a serial manner is selected and output.

Notably, the signal processing device may be an independent device or may be an internal block of an independent device.

Advantageous Effects of Invention

According to the present technology, deterioration of receiving capability can be prevented. In particular, receiving capability of a receiving system which receives a radio frequency (RF) signal can be prevented from deteriorating, for example, due to a transport stream (TS) clock and its higher harmonics acting as noise against the RF signal including the TS.

Additional features and advantages are described herein, and will be apparent from the following Detailed Description and the figures.

DETAILED DESCRIPTION

[Receiving System to which Present Technology is Applied]

Figure 1:
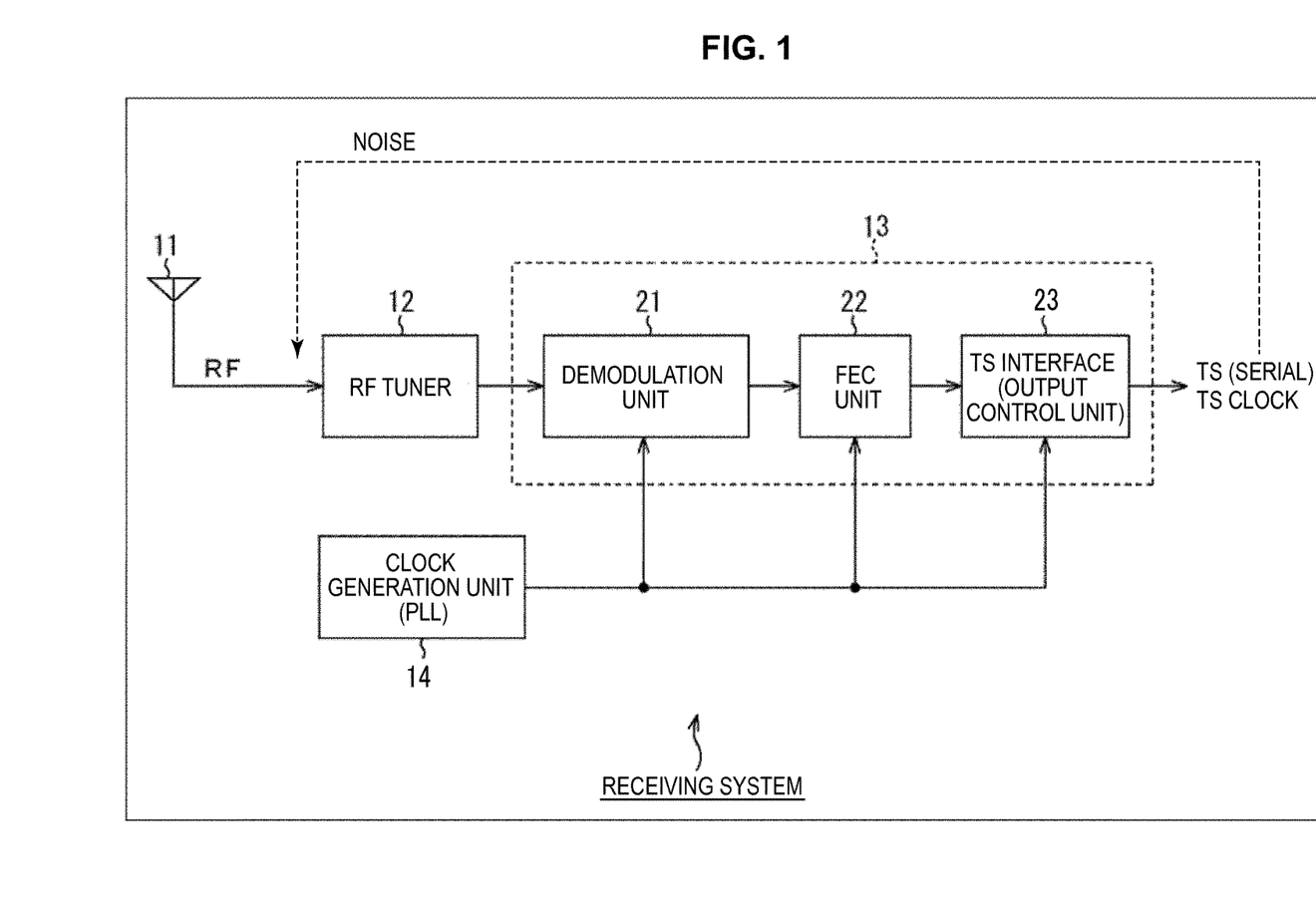
FIG. 1 is a block diagram illustrating an exemplary configuration of a receiving system to which the present technology is applied.

FIG. 1 is a block diagram illustrating an exemplary configuration of a receiving system to which the present technology is applied.

The receiving system in FIG. 1 receives, for example, digital broadcasting.

Accordingly, in FIG. 1, the receiving system has an antenna 11, an RF tuner 12, a demodulation device 13 and a clock generation unit 14.

The antenna 11 receives, for example, an RF signal of digital broadcasting including a TS and supplies it to the RF tuner 12.

The RF tuner 12 supplies a modulated signal, which has been modulated through digital modulation and has a required frequency band, from the RF signal drawn from the antenna 11 to the demodulation device 13.

The demodulation device 13 restores and processes the TS from the modulated signal from the RF tuner 12.

Accordingly, the demodulation device 13 has a demodulation unit 21, an FEC unit 22 and a TS interface 23.

The demodulation unit 21 demodulates the modulated signal from the RF tuner 12 and supplies the resulting demodulated signal to the FEC unit 22.

The FEC unit 22 performs error correction on the demodulated signal from the demodulation unit 21 and supplies the resulting signal such as the TS to the TS interface 23.

The TS interface 23 is an interface which functions as an output control unit performing output control by which the TS is output to the outside, and outputs the TS from the FEC unit 22 along with a TS clock representing timing of data of the TS from the FEC unit 22, in synchronization with the TS clock.

The clock generation unit 14 is constituted, for example, of a phase lock loop (PLL) which generates a system clock which is a base for operating the individual parts constituting the receiving system.

Furthermore, the clock generation unit 14 generates, from the system clock, clocks for respectively operating, for example, the demodulation unit 21, the FEC unit 22 and the TS interface 23 which constitute the demodulation device 13 and supplies them to the demodulation unit 21, the FEC unit 22 and the TS interface 23. The demodulation unit 21, the FEC unit 22 and the TS interface 23 operate in accordance with the clocks supplied from the clock generation unit 14.

In the receiving system configured as above, the RF signal of digital broadcasting including the TS is received by the antenna 11 and supplied to the RF tuner 12. The RF tuner 12 extracts the modulated signal with a predetermined frequency band, for example, according to user's manipulation or the like from the RF signal from the antenna 11, and supplies it to the demodulation device 13.

In the demodulation device 13, the demodulation unit 21 and the FEC unit 22 perform demodulation and error correction on the modulated signal, respectively, and the resulting TS is supplied to the TS interface 23.

The TS interface 23 obtains the TS clock from the clocks supplied from the clock generation unit 14, and outputs the TS clock. Furthermore, the TS interface 23 outputs the TS from the FEC unit 22 in a serial manner, in synchronization with the TS clock.

In the receiving system as above, when the TS clock is a clock with a fixed frequency, in the case where the TS clock and its higher harmonics are signals with frequencies largely affecting the RF signal as noise against the RF signal supplied to the RF tuner 12 as indicated by the broken line in the figure to cause RF spurious interference, the RF spurious interference cannot be prevented, causing deterioration of receiving capability of the receiving system.

In particular, when the RF tuner 12 and the demodulation device 13 are integrally configured into one chip, the TS clock with a specific frequency and its higher harmonics may be significant noise against the RF signal supplied to the RF tuner 12.

[Exemplary Configuration of First Embodiment of Receiving System to which Present Technology is Applied]

Figure 2:
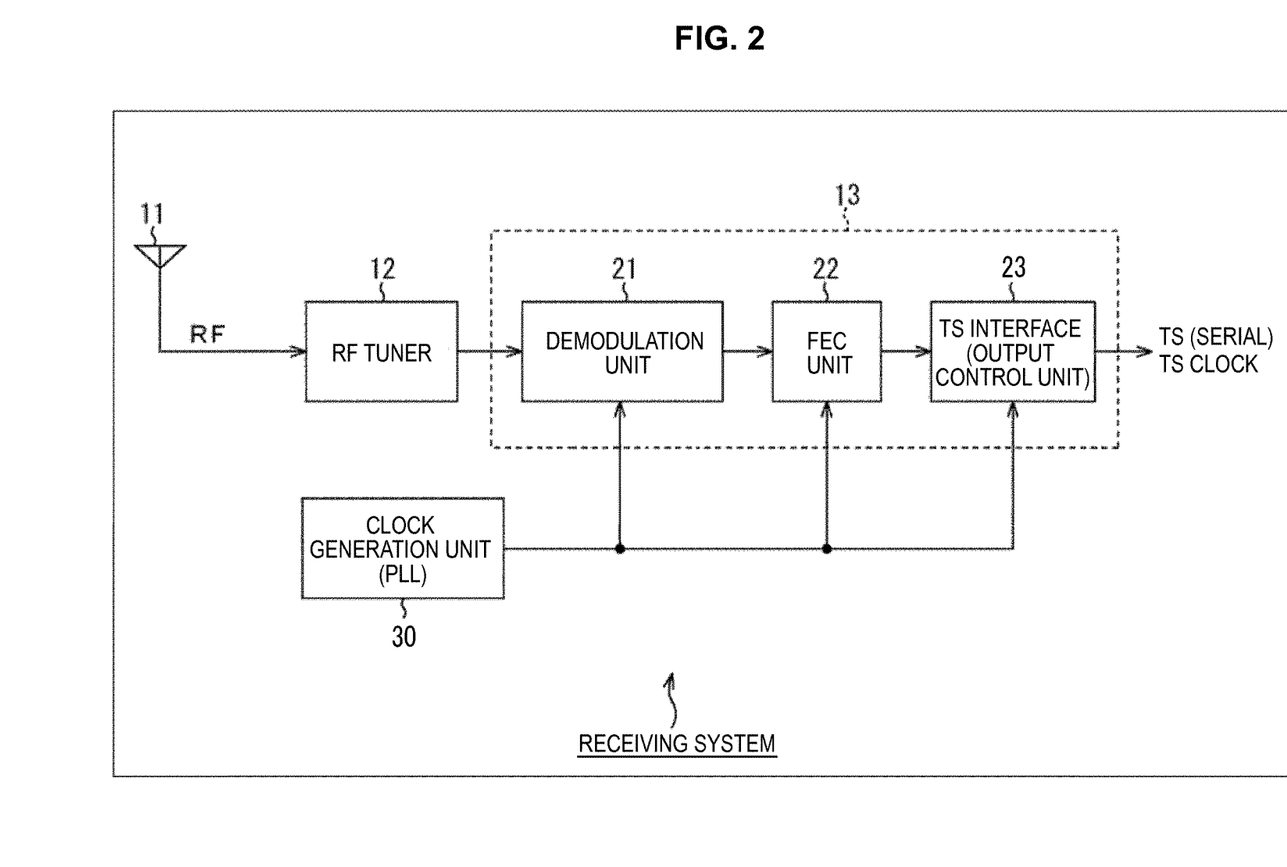
FIG. 2 is a block diagram illustrating an exemplary configuration of a first embodiment of a receiving system to which a signal processing device of the present technology is applied.

FIG. 2 is a block diagram illustrating an exemplary configuration of a first embodiment of the receiving system to which a signal processing device of the present technology is applied.

Notably, the parts in the figure corresponding to those in FIG. 1 are given the same signs and the description thereof is hereafter properly omitted.

In FIG. 2, the receiving system is common to that in FIG. 1 in that the antenna 11, the RF tuner 12 and the demodulation device 13 are included.

Note that the receiving system in FIG. 2 is different from that in FIG. 1 in that a clock generation unit 30 is provided in place of the clock generation unit 14.

Similarly to the clock generation unit 14 in FIG. 1, the clock generation unit 30 generates the system clock and generates, from the system clock, the clocks for respectively operating the demodulation unit 21, the FEC unit 22 and the TS interface 23 which constitute the demodulation device 13 to supply them to the demodulation unit 21, the FEC unit 22 and the TS interface 23.

Note that, as to a clock for operating the TS interface 23 (hereinafter also referred to as clock for TSIF), the clock generation unit 30 generates a plurality of clocks with frequencies not less than a serial rate which is a data rate at which the TS is output in a serial manner, and that it selects one clock from the plurality of clocks to supply it to the TS interface 23.

[Exemplary Configuration of TS Interface 23 and Clock Generation Unit 30]

Figure 3:
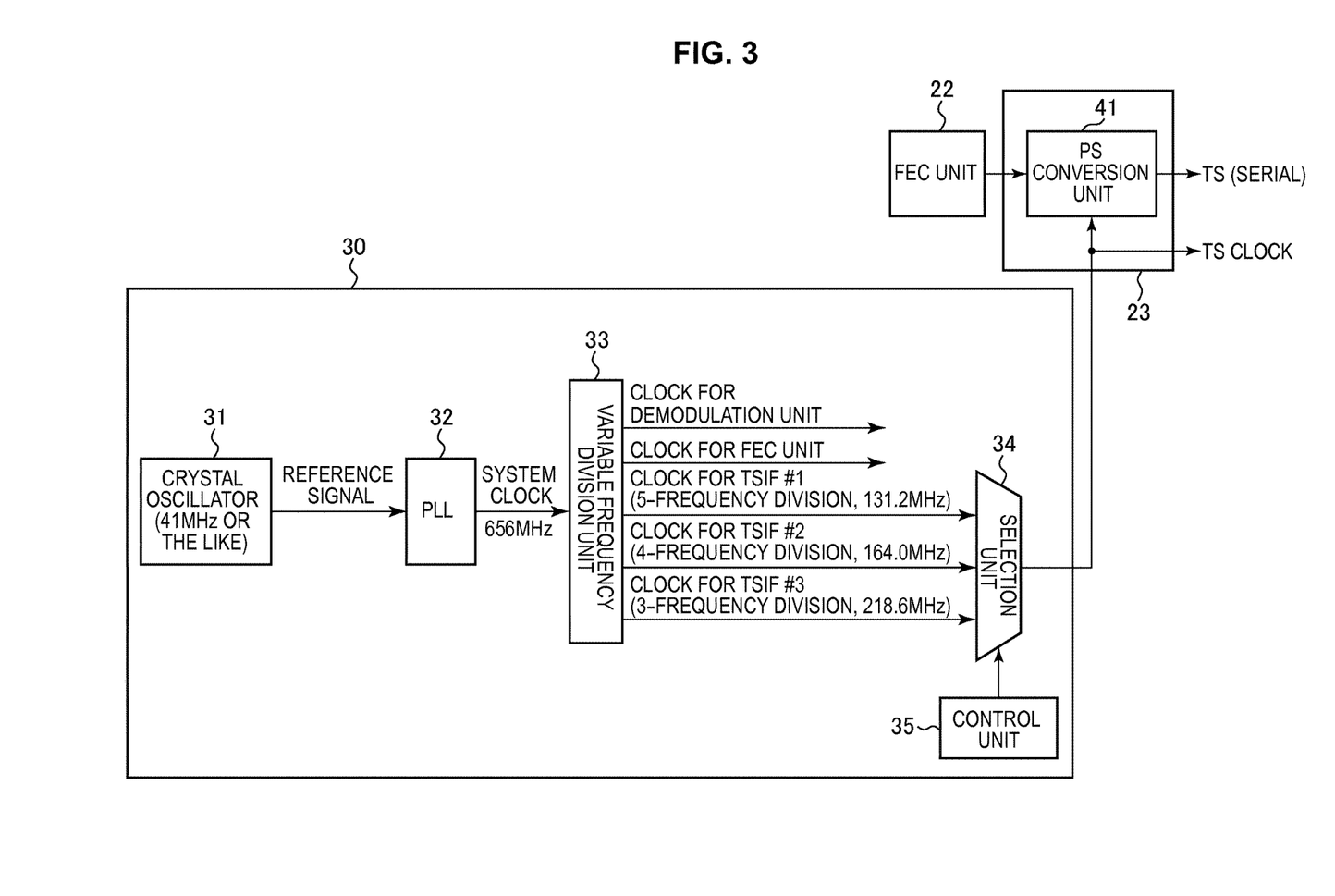
FIG. 3 is a block diagram illustrating an exemplary configuration of a TS interface 23 and a clock generation unit 30.

FIG. 3 is a block diagram illustrating an exemplary configuration of the TS interface 23 and the clock generation unit 30 in FIG. 2.

The TS interface 23 has a parallel serial (PS) conversion unit 41.

A TS packet (TS) is supplied in a parallel manner, that is, for example, on a parallel 8-bit basis or the like from the FEC unit 22 to the PS conversion unit 41.

Furthermore, to the PS conversion unit 41, the clock for TSIF with frequency not less than the serial rate from the clock generation unit 30 is supplied.

The TS interface 23 outputs the clock for TSIF from the clock generation unit 30 as the TS clock.

Moreover, in the TS interface 23, the PS conversion unit 41 receives the TS in a parallel manner from the FEC unit 22 and outputs it bit-by-bit in a serial manner.

In this stage, the PS conversion unit 41 outputs the TS in a serial manner in synchronization with the clock for TSIF from the clock generation unit 30, that is, the TS clock.

The clock generation unit 30 has a crystal oscillator 31, a PLL 32, a variable frequency division unit 33, a selection unit 34 and a control unit 35.

The crystal oscillator 31 outputs a reference signal which is a reference (base) of the oscillation of the PLL 32. Herein, when the receiving system is a system which receives ground-wave broadcasting, the frequency of the reference signal of the crystal oscillator 31 (signal output as that) is, for example, 41 MHz.

The PLL 32 performs phase comparison of the reference signal from the crystal oscillator 32, for example, with the signal obtained by 16-frequency division of the output signal output by the PLL 32, thereby, generates a pulse-shaped signal with frequency 16 times that of the reference signal as the system clock, and supplies it to the variable frequency division unit 33.

Accordingly, when the reference signal is the signal of 41 MHz, the frequency of the system clock is 656 MHz=41 MHz×16.

The variable frequency division unit 33 is a frequency divider capable of performing frequency division based on a plurality of frequency division ratios in a variable frequency division ratio. It performs frequency division on the system clock from the PLL 32, and thereby, generates one clock for operating the demodulation unit 21 (hereinafter also referred to as clock for the demodulation unit) and one clock for operating the FEC unit 22 (hereinafter also referred to as clock for the FEC unit).

Then, the variable frequency division unit 33 supplies the clock for the demodulation unit to the demodulation unit 21 and supplies the clock for the FEC unit to the FEC unit 22.

Moreover, the variable frequency division unit 33 performs frequency division on the system clock from the PLL 32, thereby, generates a plurality of clocks for TSIF with frequencies not less than the serial rate for operating the TS interface unit 23, and supplies it to the selection unit 34.

Herein, in FIG. 3, the variable frequency division unit 33 performs 5-frequency division, 4-frequency division and 3-frequency division on the system clock to generate the clocks for TSIF with three frequencies of 131.2 MHz, 164.0 MHz and 218.6 MHz.

Notably, in the embodiment, N-frequency division is a process of making a process of making the frequency of the signal 1/N times (the period of the signal N times). The method of the process is not specifically limited.

Moreover, in FIG. 3, while the variable frequency division unit 33 generates the clocks for TSIF with three frequencies, the number of the clocks for TSIF generated by the variable frequency division unit 33 may be two or four or higher instead of three.

Furthermore, the frequency division ratios are not limited to the values explicit in the embodiment but may be any values more than 0. Notably, the frequency division with the frequency division ratio being 1 means that the signal before frequency division is output to be the signal after frequency division as it is. Moreover, frequency division with a frequency division ratio being less than 1 corresponds to multiplication.

The selection unit 34 selects one clock for TSIF out of three clocks for TSIF, as the plurality of ones, supplied from the variable frequency division unit 33 in accordance with a selection signal supplied from the control unit 35, and supplies it to the TS interface 23.

The control unit 35 generates the selection signal for indicating selection of one clock for TSIF to the selection unit 34, for example, on the basis of results of error correction in the FEC unit 22 or the like, supplies it to the selection unit 34, and thereby, controls the selection unit 34.

In the TS interface 23 and the clock generation unit 30 configured as above, the PLL 32 generates the system clock and supplies it to the variable frequency division unit 33.

The variable frequency division unit 33 performs frequency division on the system clock from the PLL 32, and thereby, generates one clock for the demodulation unit, one clock for the FEC unit and different clocks for TSIF with three frequencies, as the plurality of ones.

Then, the variable frequency division unit 33 supplies the clock for the demodulation unit to the demodulation unit 21, the clock for the FEC unit to the FEC unit 22, and three clocks for TSIF to the selection unit 34, respectively.

The selection unit 34 selects one clock for TSIF out of three clocks for TSIF from the variable frequency division unit 33 in accordance with the selection signal supplied from the control unit 35, and supplies it to the TS interface 23.

The TS interface 23 outputs the clock for TSIF from the clock generation unit 30 as the TS clock.

Furthermore, in the TS interface 23, the PS conversion unit 41 receives the TS in a serial manner from the FEC unit 22 to convert it into serial data, and outputs it in synchronization with the clock for TSIF from the clock generation unit 30, that is, the TS clock.

Figure 4:
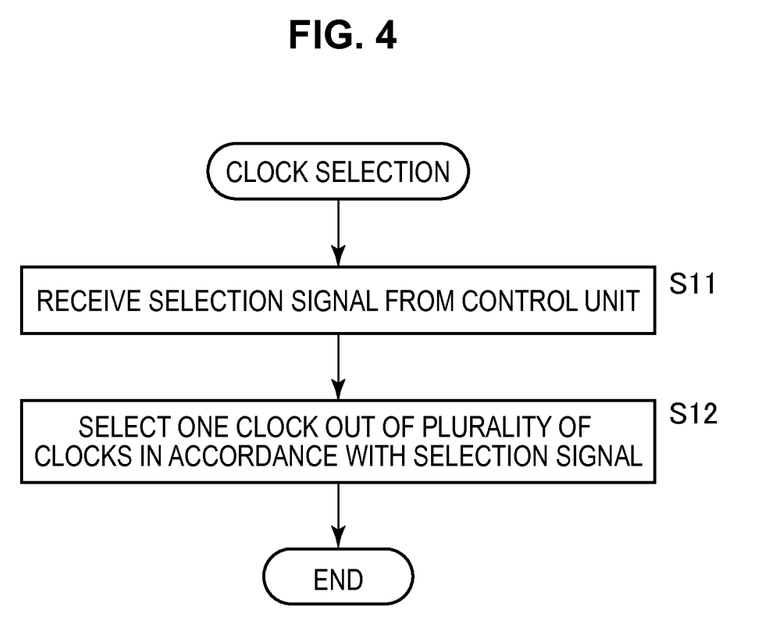
FIG. 4 is a flowchart for explaining a process of clock selection of selecting one clock for TSIF out of a plurality of clocks for TSIF in a selection unit 34.

FIG. 4 is a flowchart for explaining a process of clock selection of selecting one clock for TSIF out of the plurality of clocks for TSIF in the selection unit 34 of FIG. 3.

In step S11, the selection unit 34 waits for the supply of the selection signal from the control unit 35 and receives the selection signal.

Herein, the control unit 35 generates the selection signal for indicating selection of a clock for TSIF other than the currently selected clock for TSIF to the selection unit 34, and supplies it to the selection unit 34 when frequency of faulty error correction is high, for example, on the basis of results of error correction in the FEC unit 22.

Otherwise, the control unit 35 generates the selection signal, for example, for indicating sequential selection of the plurality of clocks for TSIF supplied from the variable frequency division unit 33 to supply it to the selection unit 34, and after that, generates the selection signal for indicating selection of the clock for TSIF with which frequency of faulty error correction is lowest to supply it to the selection unit 34 on the basis of results of error correction in the FEC unit 22.

In step S12, the selection unit 34 selects one clock for TSIF out of three clocks for TSIF from the variable frequency division unit 33 to supply it to the TS interface 23 in accordance with the selection signal supplied from the control unit 35, and terminates the process.

As described above, one clock serving as a TS clock is selected and output out of a plurality of clocks with frequencies not less than a serial rate which is a data rate at which a TS included in an RF signal is output in a serial manner (clocks for TSIF). Hence, the TS clock and its higher harmonics can be prevented from being noise against the RF signal and deteriorating receiving capability of a receiving system which receives the RF signal.

Accordingly, selection of the clock for TSIF in the selection unit 34 can shift the frequencies of the TS clock and its higher harmonics which act as the noise against the RF signal. Selection of the clock for TSIF with frequency which affects the RF signal to as less an extent as possible in the selection unit 34 can prevent (reduce) deterioration of receiving capability of the receiving system.

[Exemplary Configuration of Second Embodiment of Receiving System to which Present Technology is Applied]

Figure 5:
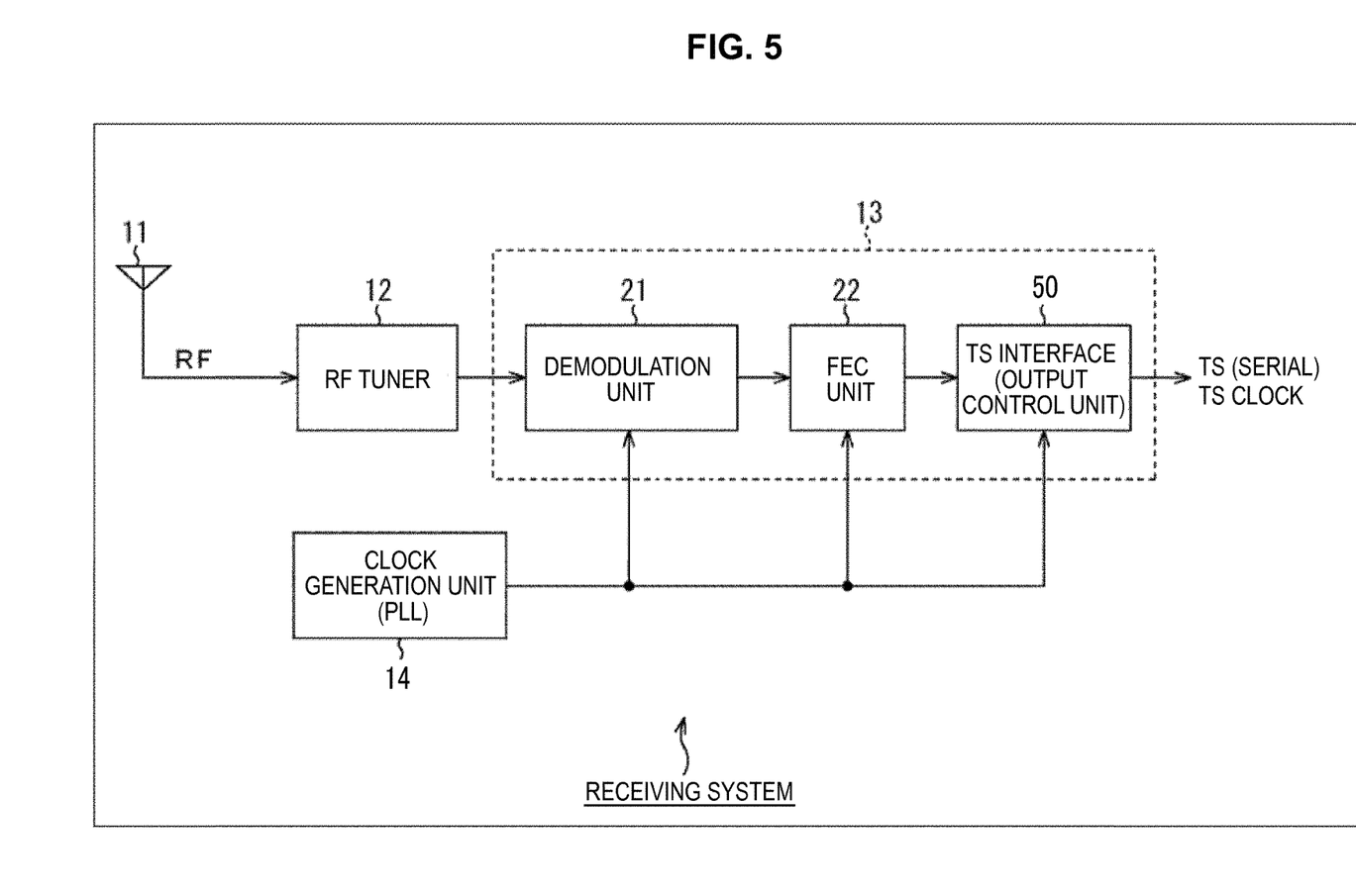
FIG. 5 is a block diagram illustrating an exemplary configuration of a second embodiment of the receiving system to which the signal processing device of the present technology is applied.

FIG. 5 is a block diagram illustrating an exemplary configuration of a second embodiment of the receiving system to which the signal processing device of the present technology is applied.

Notably, the parts in the figure corresponding to those in FIG. 1 or FIG. 2 are given the same signs and the description thereof is hereafter properly omitted.

In FIG. 5, the receiving system is common to that in FIG. 1 in that the antenna 11, the RF tuner 12, the demodulation device 13 and the clock generation unit 14 are included.

Note that the receiving system in FIG. 5 is different from that in FIG. 1 in that the demodulation device 13 has a TS interface 50 in place of the TS interface 23.

The TS interface 50 is common to the TS interface 23 in FIG. 1 (FIG. 3) in that it functions as an output control unit which performs output control of outputting the TS to the outside.

Note that the TS interface 50 is different from the TS interface 23 (FIG. 1, FIG. 2 and FIG. 3) which uses the clock for TSIF supplied from the clock generation unit 14 as the TS clock at all times, in that a plurality of clocks with frequencies not less than the serial rate are generated by performing frequency division on the clock for TSIF supplied from the clock generation unit 14, and in that one clock serving as the TS clock is selected out of the plurality of clocks.

[Exemplary Configuration of Clock Generation Unit 14 and TS Interface 50]

Figure 6:
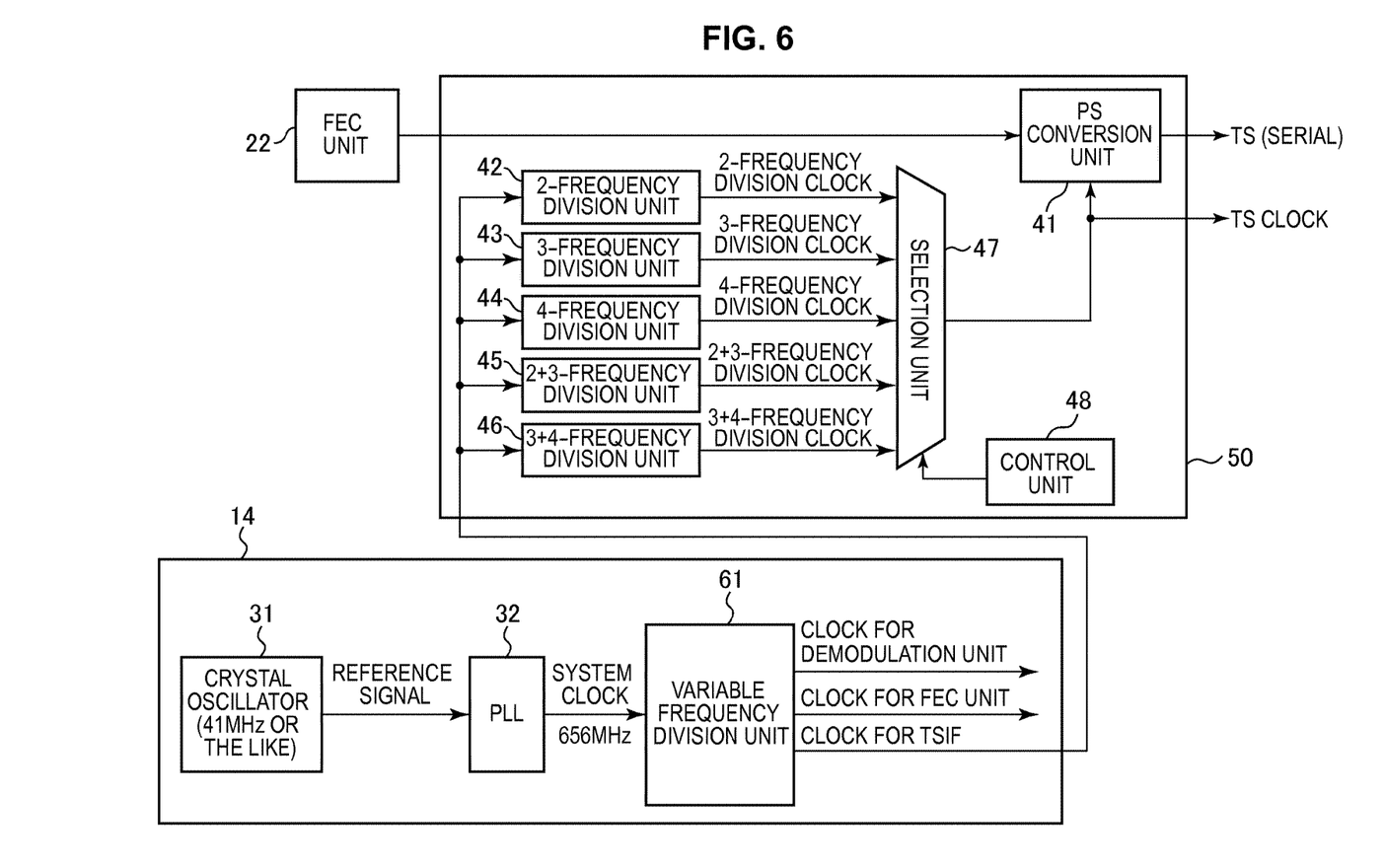
FIG. 6 is a block diagram illustrating an exemplary configuration of a clock generation unit 14 and a TS interface 50.

FIG. 6 is a block diagram illustrating an exemplary configuration of the clock generation unit 14 and the TS interface 50 in FIG. 5.

Notably, the parts in the figure corresponding to those of the TS interface 23 and the clock generation unit 30 in FIG. 3 are given the same signs and the description thereof is hereafter properly omitted.

The clock generation unit 14 is common to the clock generation unit 30 in FIG. 3 in that the crystal oscillator 31 and the PLL 32 are included.

Note that the clock generation unit 14 is different from the clock generation unit 30 in FIG. 3 in that a variable frequency division unit 61 in place of the variable frequency division unit 33 is provided, and in that the selection unit 34 or the control unit 35 is not included.

In the clock generation unit 14, the variable frequency division unit 61 generates, similarly to the variable frequency division unit 33 in FIG. 3, one clock for the demodulation unit and one clock for the FEC unit by performing frequency division on the system clock from the PLL 32, supplies the clock for the demodulation unit to the demodulation unit 21 and supplies the clock for the FEC unit to the FEC unit 22.

Moreover, the variable frequency division unit 61 generates one clock for TSIF (not the plurality of ones) by performing frequency division on the system clock from the PLL 32, and supplies it to the TS interface 50.

The TS interface 50 is common to the TS interface 23 in FIG. 3 in that the PS conversion unit 41 is included.

Note that the TS interface 50 is different from the TS interface 23 in FIG. 3 in that a 2-frequency division unit 42, a 3-frequency division unit 43, a 4-frequency division unit 44, a 2+3-frequency division unit 45, a 3+4-frequency division unit 46, a selection unit 47 and a control unit 48 are included.

To the 2-frequency division unit 42 to the 3+4-frequency division unit 46, the clock for TSIF is supplied from the (variable frequency division unit 61 of) clock generation unit 14.

The 2-frequency division unit 42 to the 3+4-frequency division unit 46 generate five clocks as the plurality of clocks with frequencies not less than the serial rate by performing frequency division on the clock for TSIF from the clock generation unit 14, and supplies them to the selection unit 47.

Accordingly, the 2-frequency division unit 42 generates a 2-frequency division clock with frequency ½ times the frequency of the clock for TSIF by performing 2-frequency division on the clock for TSIF from the clock generation unit 14, and supplies it to the selection unit 47.

The 3-frequency division unit 43 generates a 3-frequency division clock with frequency ⅓ times the frequency of the clock for TSIF by performing 3-frequency division on the clock for TSIF from the clock generation unit 14, and supplies it to the selection unit 47.

The 4-frequency division unit 44 generates a 4-frequency division clock with frequency ¼ times the frequency of the clock for TSIF by performing 4-frequency division on the clock for TSIF from the clock generation unit 14, and supplies it to the selection unit 47.

The 2+3-frequency division unit 45 generates a 2+3-frequency division clock having a 2-frequency division clock and a 3-frequency division clock mixed, by performing 2-frequency division and 3-frequency division on the clock for TSIF from the clock generation unit 14, and supplies it to the selection unit 47.

The 3+4-frequency division unit 46 generates a 3+4-frequency division clock having a 3-frequency division clock and a 4-frequency division clock mixed, by performing 3-frequency division and 4-frequency division on the clock for TSIF from the clock generation unit 14, and supplies it to the selection unit 47.

Notably, any of the frequencies of the 2-frequency division clock, the 3-frequency division clock, the 4-frequency division clock, the 2+3-frequency division clock and the 3+4-frequency division clock is equal to or greater than the serial rate.

The selection unit 47 selects one frequency division clock out of five frequency division clocks (the 2-frequency division clock, the 3-frequency division clock, the 4-frequency division clock, the 2+3-frequency division clock and the 3+4-frequency division clock) supplied from the 2-frequency division unit 42 to the 3+4-frequency division unit 46 in accordance with the selection signal supplied from the control unit 48, outputs it as the TS clock and supplies it to the PS conversion unit 41.

The control unit 48 generates the selection signal for indicating selection of one frequency division clock to the selection unit 47, for example, on the basis of results of error correction in the FEC unit 22 or the like, supplies it to the selection unit 47, and thereby, controls the selection unit 47.

In the clock generation unit 14 and the TS interface 50 configured as above, the PLL 32 generates the system clock and supplies it to the variable frequency division unit 61.

The variable frequency division unit 61 generates one clock for the demodulation unit, one clock for the FEC unit and one clock for TSIF by performing frequency division on the system clock from the PLL 32.

Then, the variable frequency division unit 61 supplies the clock for the demodulation unit to the demodulation unit 21, the clock for the FEC unit to the FEC unit 22, and the clock for TSIF to the TS interface 50, respectively.

In the TS interface 50, the 2-frequency division unit 42 to the 3+4-frequency division unit 46 generate five frequency division clocks which are different in frequency component and are the 2-frequency division clock, the 3-frequency division clock, the 4-frequency division clock, the 2+3-frequency division clock and the 3+4-frequency division clock by performing frequency division on the clock for TSIF from the variable frequency division unit 61, and supply them to the selection unit 47.

The selection unit 47 selects one frequency division clock out of five frequency division clocks from the variable frequency division unit 61 in accordance with the selection signal supplied from the control unit 48, outputs it as the TS clock and supplies it to the PS conversion unit 41.

The PS conversion unit 41 receives the TS in a parallel manner from the FEC unit 22 and outputs it in a serial manner in synchronization with the TS clock from the selection unit 47.

[Clock for TSIF and Frequency Division Clocks]

Figure 7:
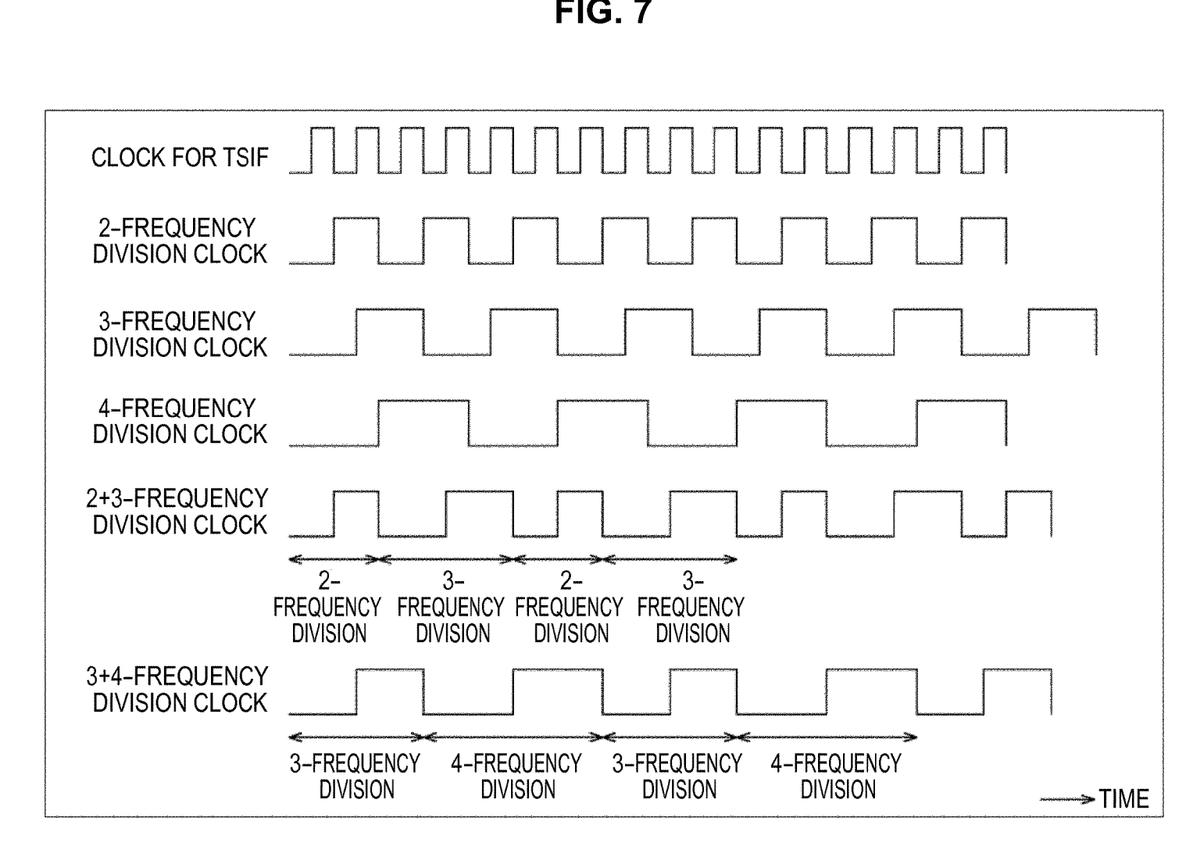
FIG. 7 is a diagram of waveforms in which the clock for TSIF and frequency division clocks generated by performing frequency division on the clock for TSIF in a 2-frequency division unit 42 to a 3+4-frequency division unit 46 are illustrated.

FIG. 7 is a diagram of waveforms in which the clock for TSIF and the frequency division clocks obtained by performing frequency division on the clock for TSIF in the 2-frequency division unit 42 to the 3+4-frequency division unit 46 are exemplarily illustrated.

The 2-frequency division clock is a clock with frequency ½ times the frequency of the clock for TSIF. Similarly, the 3-frequency division clock is a clock with frequency ⅓ times the frequency of the clock for TSIF, and the 4-frequency division clock is a clock with frequency ¼ times the frequency of the clock for TSIF.

The 2+3-frequency division clock is a clock having the 2-frequency division clock with frequency ½ times the frequency of the clock for TSIF and the 3-frequency division clock with frequency ⅓ times the frequency of the clock for TSIF mixed, and is a clock having one period of the 2-frequency division clock and one period of the 3-frequency division clock put alternately.

The 3+4-frequency division clock is a clock having the 3-frequency division clock with frequency ⅓ times the frequency of the clock for TSIF the 4-frequency division clock with frequency ¼ times the frequency of the clock for TSIF mixed, and is a clock having one period of the 3-frequency division clock and one period of the 4-frequency division clock put alternately.

Figure 8:
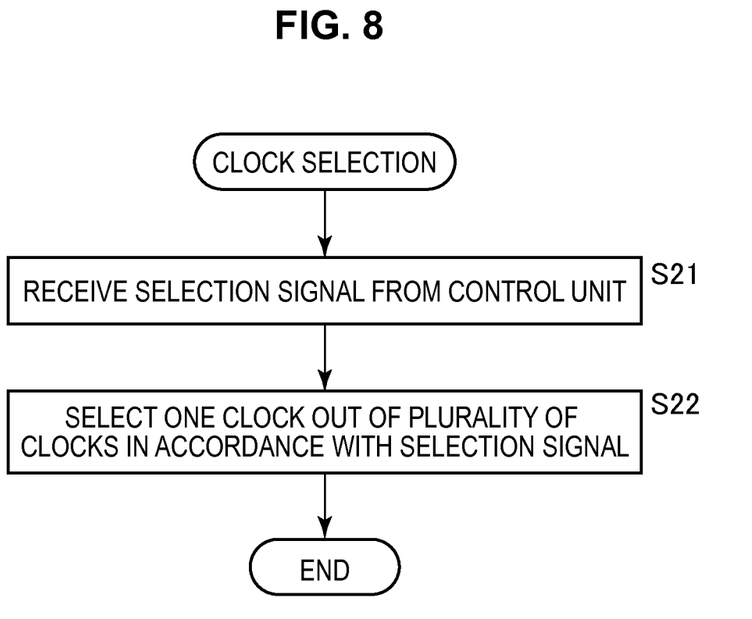
FIG. 8 is a flowchart for explaining a process of clock selection of selecting one frequency division clock out of a plurality of frequency division clocks in a selection unit 47.

FIG. 8 is a flowchart for explaining a process of clock selection of selecting one frequency division clock out of the plurality of frequency division clocks in the selection unit 47 of FIG. 6.

In step S21, the selection unit 47 waits for the supply of the selection signal from the control unit 48 and receives the selection signal.

Herein, the control unit 48 generates the selection signal similarly to the control unit 35 in FIG. 3 and supplies it to the selection unit 47.

Accordingly, the control unit 48 generates the selection signal for indicating selection of a frequency division clock other than the currently selected frequency division clock to the selection unit 47, and supplies it to the selection unit 47 when frequency of faulty error correction is high, for example, on the basis of results of error correction in the FEC unit 22.

Otherwise, the control unit 48 generates the selection signal, for example, for indicating sequential selection of five frequency division clocks output by the 2-frequency division unit 42 to the 3+4-frequency division unit 46 to supply it to the selection unit 47, and after that, generates the selection signal for indicating selection of the frequency division clock with which frequency of faulty error correction is lowest to supply it to the selection unit 47 on the basis of results of error correction in the FEC unit 22.

In step S22, the selection unit 47 selects one frequency division clock out of five frequency division clocks output by the 2-frequency division unit 42 to the 3+4-frequency division unit 46 to output it as the TS clock and to supply it to the PS conversion unit 41 in accordance with the selection signal supplied from the control unit 48, and terminates the process.

As described above, one clock serving as a TS clock is selected and output out of a plurality of clocks with frequencies not less than a serial rate which is a data rate at which a TS included in an RF signal is output in a serial manner (frequency division clock). Hence, the TS clock and its higher harmonics can be prevented from being noise against the RF signal and deteriorating receiving capability of a receiving system which receives the RF signal.

Accordingly, selection of the frequency division clock in the selection unit 47 can shift the frequencies of the TS clock and its higher harmonics which act as the noise against the RF signal. Selection of the frequency division clock with frequency which affects the RF signal to as less an extent as possible in the selection unit 47 can prevent (reduce) deterioration of receiving capability of the receiving system.

Notably, in FIG. 6, the frequency division clock such as the 2+3-frequency division clock having the frequency division clocks which are obtained by frequency division with different frequency division ratios such as the 2-frequency division clock and the 3-frequency division clock mixed (hereinafter also referred to as mixed clock) is generated. The mixed clock has a smaller peak in frequency (amplitude) characteristics compared with the frequency division clock with single frequency used for generating the mixed clock itself.

Accordingly, the mixed clock can be considered to have a smaller level as noise compared with the frequency division clock with single frequency used for generating the mixed clock itself. Such a mixed clock can reduce the influence as noise on the RF signal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

[Exemplary Configuration of Third Embodiment of Receiving System to which Present Technology is Applied]

Figure 9:
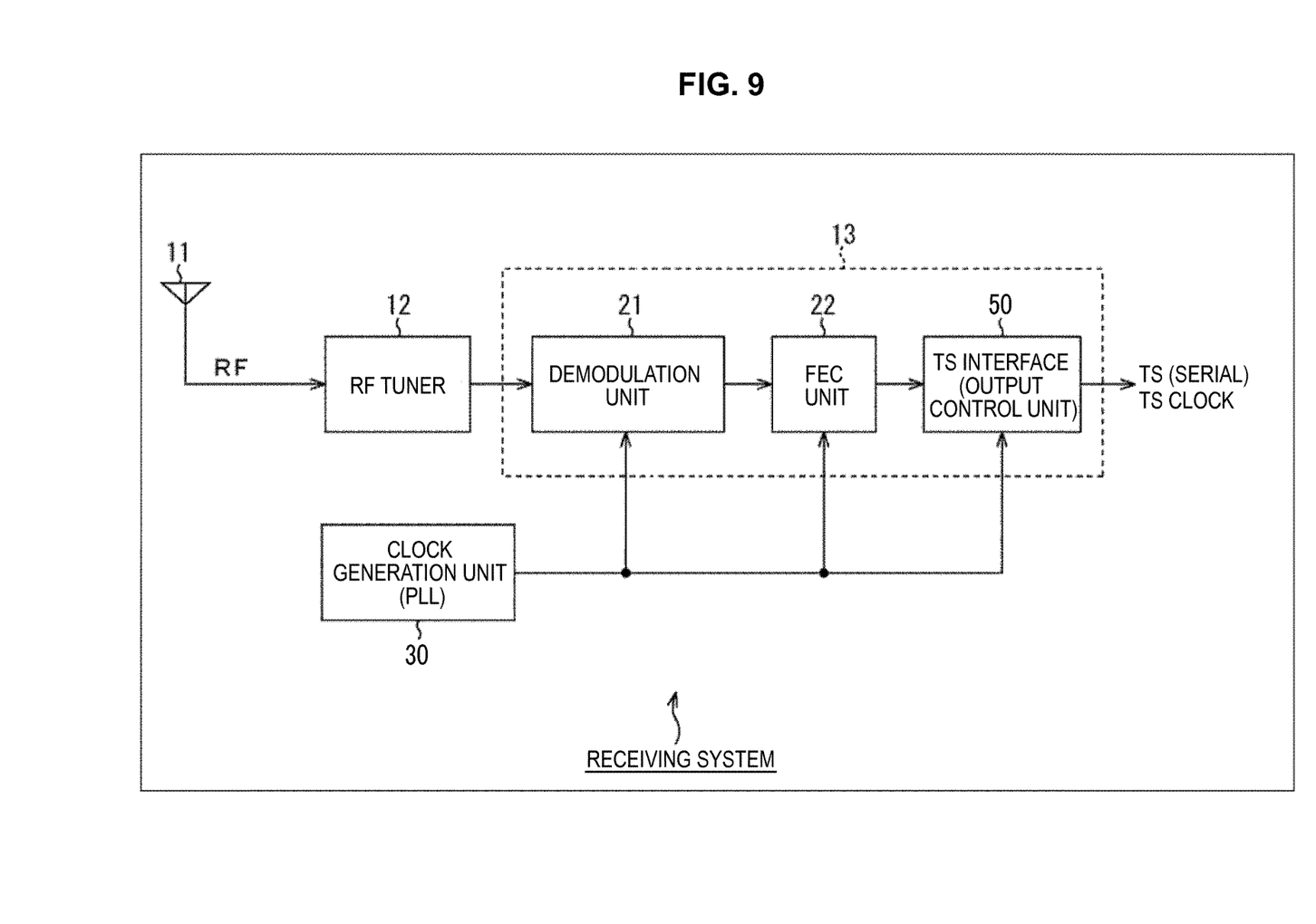
FIG. 9 is a block diagram illustrating an exemplary configuration of a third embodiment of the receiving system to which the signal processing device of the present technology is applied.

FIG. 9 is a block diagram illustrating an exemplary configuration of a third embodiment of the receiving system to which the signal processing device of the present technology is applied.

Notably, the parts in the figure corresponding to those in FIG. 1, FIG. 2 or FIG. 5 are given the same signs and the description thereof is hereafter properly omitted.

In FIG. 9, the receiving system is common to that in FIG. 1 in that the antenna 11, the RF tuner 12, the demodulation unit 21 and the FEC unit 22 are included.

Note that the receiving system in FIG. 9 is different from that in FIG. 1 in that the clock generation unit 30 in FIG. 2 is provided in place of the clock generation unit 14, and in that the TS interface 50 in FIG. 5 is included in place of the TS interface 23.

In the clock generation unit 30, for example, as described using FIG. 3, one clock for TSIF is selected out of three clocks for TSIF with different frequencies. In the TS interface 30, for example, as described using FIG. 6, five frequency division clocks different in frequency component are generated from the clock for TSIF (intermediate clock) (selected by the clock generation unit 30), and one frequency division clock is selected as the TS clock from the five frequency division clocks.

Accordingly, in the receiving system of FIG. 9, the TS clock can be selected out of 15(=3×5) kinds of clocks. Hence, the TS clock that can reduce deterioration of receiving capability of the receiving system more can be selected.

Herein, the receiving system in FIG. 2, FIG. 5 or FIG. 9 can be implemented without requirement for a much larger circuit scale compared with the receiving system in FIG. 1.

Notably, in the embodiments, the cases where the TS packet is output bit-by-bit in a serial manner are described. Otherwise, the present technology can be applied to other cases, for example, where the TS packet is output 8-bit-by-8-bit in a parallel manner.

Moreover, the present technology can be applied to a case where an arbitrary stream other than the TS is output, that is, where a stream is output along with a clock for synchronizing the stream.

[Description of Computer to which Present Technology is Applied]

Next, at least part of processes among the above-mentioned series of processes may be performed by hardware or may be performed by software. When the processes are performed by the software, a program constituting the software is installed in a general-purpose computer or the like.

Figure 10:
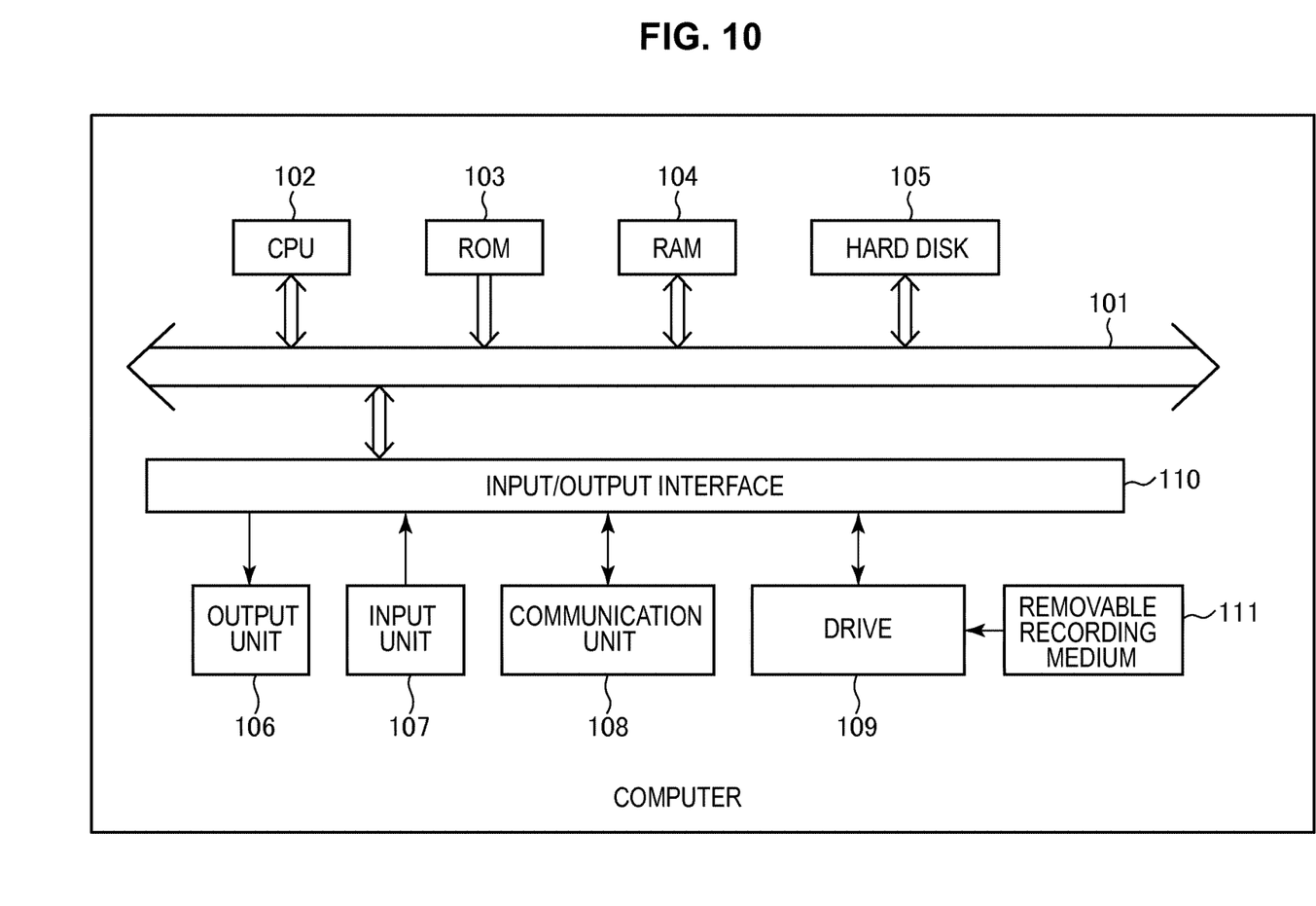
FIG. 10 is a block diagram illustrating an exemplary configuration of an embodiment of a computer to which the present technology is applied.

Therefore, FIG. 10 illustrates an exemplary configuration of an embodiment of a computer in which the program which performs the processes is installed.

The program can be recorded in advance in a hard disk drive 105 or a ROM 103 as a recording medium built in the computer.

Otherwise, the program can be stored (recorded) in a removable recording medium 111. Such a removable recording medium 111 can be provided as so-called package software. Herein, examples of the removable recording medium 111 can include a flexible disk, a compact disc read only memory (CD-ROM), a magneto-optical (MO) disc, a digital versatile disc (DVD), a magnetic disk, a semiconductor memory and the like.

Notably, while the program can be installed in the computer from the removable recording medium 111 as mentioned above, it can also be downloaded in the computer via a communication network or a broadcasting network to be installed in the built-in hard disk drive 105. Accordingly, the program can be transferred to the computer in a wireless manner, for example, from a download site via an artificial satellite for satellite digital broadcasting, or transferred to the computer via a network such as a local area network (LAN) and the Internet.

The computer includes a central processing unit (CPU) 102 inside, and to the CPU 102, an I/O interface 110 is connected via a bus 101.

Upon input of a command from a user, for example, operating an input unit 107 via the I/O interface 110, in accordance with this, the CPU 102 executes the program stored in a read only memory (ROM) 103. Otherwise, the CPU 102 loads the program stored in the hard disk drive 105 into a random access memory (RAM) 104 to execute it.

By doing so, the CPU 102 performs the processes according to the above-mentioned flowcharts, or the processes according to the configurations in the above-mentioned block diagrams. Then, the CPU 102 causes, for example, via the I/O interface 110, the results of the processes to be output from an output unit 106, to be transmitted from a communication unit 108, or to be recorded in the hard disk drive 105 as needed.

Notably, the input unit 107 is constituted of a keyboard, a mouse, a microphone and/or the like. Moreover, the output unit 106 is constituted of a liquid crystal display (LCD), a loud speaker and the like.

Processing performed herein by the computer according to a program does not necessarily have to be performed chronologically in the order described in a flow chart. That is, processing performed by the computer according to a program also includes processing performed in parallel or individually (for example, parallel processing or processing by an object).

The program may be processed by one computer (processor) or by a plurality of computers in a distributed manner. Further, the program may be performed after being transferred to a remote computer.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)

A signal processing device including a selection unit that selects and outputs one clock serving as a transport stream (TS) clock, which represents timing of data of a TS, among a plurality of clocks with frequencies not less than a serial rate which is a data rate at which the TS included in a radio frequency (RF) signal is output in a serial manner.

(2)

The signal processing device according to (1), further including a frequency division unit that generates the plurality of clocks with the frequencies not less than the serial rate by performing frequency division on a predetermined system clock.

(3)

The signal processing device according to (1), further including a frequency division unit that generates the plurality of clocks with the frequencies not less than the serial rate by performing frequency division on a clock generated by performing frequency division on a predetermined system clock.

(4)

The signal processing device according to (1), further including:

a first frequency division unit that generates a plurality of intermediate clocks with frequencies not less than the serial rate by performing frequency division on a predetermined system clock; and a second frequency division unit that generates a plurality of clocks with the frequencies not less than the serial rate by performing frequency division on one intermediate clock selected out of the plurality of intermediate clocks generated by the first frequency division unit, wherein a first selection unit that selects the one intermediate clock out of the plurality of intermediate clocks generated by the first frequency division unit and a second selection unit that selects and outputs one clock out of the plurality of clocks with the frequencies not less than a serial rate generated by the second frequency division unit performing the frequency division on the one intermediate clock selected by the first selection unit are included as the selection unit.

(5)

The signal processing device according to any one of (1) to (4), further including a control unit that controls selection of the clock by the selection unit, wherein the control unit causes a clock with a frequency which less affects the RF signal to be selected.

(6)

The signal processing device according to (5), wherein the TS is obtained by performing demodulation and error correction on the RF signal, and wherein the control unit controls the selection of the clock by the selection unit on the basis of a result of the error correction.

(7)

A signal processing method including a selection step of selecting and outputting one clock serving as a transport stream (TS) clock, which represents timing of data of a TS, among a plurality of clocks with frequencies not less than a serial rate which is a data rate at which the TS included in a radio frequency (RF) signal is output in a serial manner.

REFERENCE SIGNS LIST

11 Antenna
12 RF tuner
13 Demodulation device
14 Clock generation unit
21 Demodulation unit
22 FEC unit
23 TS interface
30 Clock generation unit
31 Crystal oscillator
32 PLL
33 Variable frequency division unit
34 Selection unit
35 Control unit
41 PS conversion unit
42 2-frequency division unit
43 3-frequency division unit
44 4-frequency division unit
45 2+3-frequency division unit
46 3+4-frequency division unit
47 Selection unit
48 Control unit
50 TS interface
61 Variable frequency division unit
101 Bus
102 CPU
103 ROM
104 RAM
105 Hard disk drive
106 Output unit
107 Input unit
108 Communication unit
109 Drive
110 I/O interface
111 Removable recording medium

The invention claimed is:

1. A signal processing device comprising:
a demodulation device including a demodulation unit, a forward error correction unit and a transport stream interface,
a clock generation unit configured to generate a plurality of clocks to the demodulation unit, the forward error correction unit and the transport stream interface,
a radio frequency tuner configured to output a modulated radio frequency signal, and
a selection unit configured to select and output a transport stream clock among the plurality of clocks with frequencies not less than a serial rate of a transport stream included in the modulated radio frequency signal,
wherein the radio frequency tuner and the demodulation device are integrated in one chip.

2. The signal processing device according to claim 1, further comprising a frequency division unit, wherein the plurality of clocks is configured to be generated with the frequencies not less than the serial rate by performing frequency division on a system clock.

3. The signal processing device according to claim 1, further comprising a frequency division unit, the plurality of clocks is configured to be generated with the frequencies not less than the serial rate by performing frequency division on a clock generated by performing frequency division on a system clock.

4. The signal processing device according to claim 1, further comprising:
a first frequency division unit configured to generate a plurality of intermediate clocks with frequencies not less than the serial rate by performing frequency division on a system clock; and
a second frequency division unit configured to generate a plurality of clocks with the frequencies not less than the serial rate by performing frequency division on a first intermediate clock selected out of the plurality of intermediate clocks generated by the first frequency division unit,
wherein the selection unit includes:
a first selection unit configured to select the first intermediate clock out of the plurality of intermediate clocks generated by the first frequency division unit and
a second selection unit configured to select and output a first clock out of the plurality of clocks with the frequencies not less than a serial rate generated by the second frequency division unit performing the frequency division on the first intermediate clock selected by the first selection unit.

5. The signal processing device according to claim 4, further comprising a control unit configured to control selection of the first clock by the selection unit.

6. The signal processing device according to claim 5, wherein the transport stream is obtained by performing demodulation and error correction on the modulated radio frequency signal, and wherein the control unit is configured to control the selection of the first clock by the selection unit on the basis of a result of the error correction.

7. A signal processing method by a signal processing device including a radio frequency tuner configured to output a modulated radio frequency signal and a demodulation device comprising:

generating a plurality of clocks to the demodulation device including a demodulation unit, a forward error correction unit, and a transport stream interface;

selecting and outputting a transport stream clock among the plurality of clocks with frequencies not less than a serial rate of a transport stream included in the modulated radio frequency signal;

wherein the radio frequency tuner and the demodulation device are integrated in one chip.

8. The signal processing device according to claim 1, wherein the selection unit is provided in the transport stream interface.

9. The signal processing device according to claim 1, wherein the selection unit is provided in the clock generation unit.

10. The signal processing device according to claim 2, wherein the frequency division unit is configured to generate a mixed frequency, and wherein the mixed frequency includes a ½ frequency and a ⅓ frequency of the system clock.

11. The signal processing device according to claim 1, wherein the radio frequency tuner is directly connected to the demodulation device.

12. The signal processing device according to claim 1, wherein the signal processing device is configured to receive a digital broadcast signal.

13. A non-transitory computer-readable program comprising instructions for causing a computer configured to control the signal processing device to perform the signal processing method according to claim 7.

\* \* \* \* \*